Patented July 7, 1925.

1,544,911

UNITED STATES PATENT OFFICE.

FREDERICK LAIST, OF ANACONDA, MONTANA, ASSIGNOR TO ANACONDA COPPER MINING COMPANY, A CORPORATION OF MONTANA.

PROCESS FOR THE RECOVERY OF VANADIUM FROM PHOSPHORIC-ACID SOLUTION.

No Drawing.    Application filed January 24, 1925. Serial No. 4,527.

*To all whom it may concern:*

Be it known that I, FREDERICK LAIST, a citizen of the United States, residing at Anaconda, in the county of Deerlodge and State of Montana, have invented certain new and useful Improvements in Processes for the Recovery of Vanadium from Phosphoric-Acid Solution, of which the following is a specification.

This invention relates to a process for separating and recovering vanadium from acid solutions, and particularly from phosphoric acid solutions by precipitation with soluble ferrocyanide, such as the ferrocyanides of the alkali-forming metals, i. e. the alkali and alkaline earth metals, for instance calcium or sodium ferrocyanide.

My invention further resides in a process for recovering vanadium from acid solutions such as crude phosphoric acid solutions derived from certain phosphate rocks, by precipitating the vanadium with a soluble ferrocyanide, and the regeneration or recovery of the ferrocyanide for reuse.

In the interest of clarity and convenience, the process will be described in connection with its use in the phosphate fertilizer industry, although of course it is to be understood that the process is one of general application.

In the production of double phosphates from phosphate rock according to well known methods the finely divided mineral is treated with sulphuric acid and the reaction product is leached. When a vanadium containing phosphate rock such as the so-called Idaho phosphate rock, a typical analysis of which shows 33% of phosphorous calculated as $P_2O_5$ and 0.15% of vanadium, is used the resulting solution contains in addition to phosphoric acid appreciable amounts of vanadium, as is evidenced by its deep green color. Heretofore this dissolved vanadium has been lost, and the provision of a process for its recovery is the principal purpose of my invention.

In accordance with my invention the vanadium containing phosphoric acid solution is treated with a soluble ferrocyanide such as sodium or calcium ferrocyanide in quantity sufficient to precipitate the vanadium and most or all of the iron present. This precipitate may then be separated by filtration or other suitable methods.

The soluble ferrocyanide is then regenerated for reuse by treating the precipitate with a suitable alkaline compound of an alkali-forming metal, such as caustic soda or lime, whereby a solution of the corresponding metal ferrocyanide is formed which may be used for the treatment of a subsequent batch of the vanadium containing solution. The residue may be worked up for its vanadium content by any suitable method, for instance by dissolving the residue in sulphuric acid and precipitating the vanadium with an alkali. This further treatment of the vanadium-containing residue however forms no part of my present invention.

I claim:—

1. A process for the separation of vanadium from acid solutions containing the same, which comprises adding a soluble ferrocyanide thereto to precipitate the vanadium, and treating the precipitate with an alkaline compound of a metal capable of forming a soluble ferrocyanide.

2. A process for the separation of vanadium from phosphoric acid solutions containing the same, which comprises the addition of a soluble ferrocyanide thereto.

3. A process for the separation of vanadium from phosphoric acid solutions containing the same, which comprises adding a soluble ferrocyanide thereto to precipitate the vanadium, and treating the precipitate with an alkaline compound of a metal capable of forming a soluble ferrocyanide.

4. A process for the separation of vanadium from phosphoric acid solutions containing the same, which comprises adding a ferrocyanide of an alkaline earth metal thereto, to precipitate the vanadium, and treating the precipitate with the hydroxide of said alkaline earth metal to regenerate the ferrocyanide.

In testimony whereof, I affix my signature.

FREDERICK LAIST.